(12) United States Patent
Griffin, Jr. et al.

(10) Patent No.: US 8,740,179 B2
(45) Date of Patent: Jun. 3, 2014

(54) TWO-PIECE TRIM FOR USE WITH FLUID REGULATORS

(75) Inventors: James Lyman Griffin, Jr., McKinney, TX (US); Thomas Leroy Weyer, Jr., McKinney, TX (US); Daniel Gunder Roper, Lucas, TX (US); Harold Joe McKinney, Durant, OK (US)

(73) Assignee: Fisher Controls International, LLC, Marshalltown, IA (US)

( * ) Notice: Subject to any disclaimer, the term of this patent is extended or adjusted under 35 U.S.C. 154(b) by 15 days.

(21) Appl. No.: 12/015,226

(22) Filed: Jan. 16, 2008

(65) Prior Publication Data
US 2008/0258097 A1    Oct. 23, 2008

Related U.S. Application Data

(60) Provisional application No. 60/912,602, filed on Apr. 18, 2007.

(51) Int. Cl.
*F16K 31/00* (2006.01)

(52) U.S. Cl.
USPC ............................ 251/61.2; 251/127; 251/360

(58) Field of Classification Search
USPC .............. 251/61.2, 118, 205, 61.5, 127, 360, 251/359; 137/329.01, 271, 550
See application file for complete search history.

(56) References Cited

U.S. PATENT DOCUMENTS

| 1,675,992 | A | * | 7/1928 | Sherman | ........................ 239/111 |
| 3,001,550 | A | | 7/1959 | Engel et al. | |
| 3,648,718 | A | | 3/1972 | Curran | |
| 3,746,263 | A | * | 7/1973 | Reeder et al. | ................... 239/542 |
| 3,776,278 | A | * | 12/1973 | Allen | ....................... 137/625.38 |
| 3,813,079 | A | | 5/1974 | Baumann et al. | |

(Continued)

FOREIGN PATENT DOCUMENTS

| CN | 2150407 | 12/1993 |
| FR | 2152151 | 4/1973 |

(Continued)

OTHER PUBLICATIONS

International Searching Authority, "International Search Report" issued in connection with counterpart International patent application PCT/US2008/059782, mailed on Aug. 6, 2008, 4 pages.

(Continued)

*Primary Examiner* — John K Fristoe, Jr.
*Assistant Examiner* — Andrew J Rost
(74) *Attorney, Agent, or Firm* — Hanley, Flight & Zimmerman, LLC.

(57) ABSTRACT

Two-piece trim apparatus for use with fluid regulators are described. In one described example, a fluid regulator has a regulator body and a first seat ring to provide a first flow characteristic disposed within the body and defining a fluid orifice. The first seat ring is interchangeable with a second seat ring that is to provide a second flow characteristic different from the first flow characteristic. The fluid regulator also includes a first cage to provide a third fluid characteristic and removably coupled to the first seat ring. The first cage is interchangeable with a second cage that is to provide a fourth fluid flow characteristic different from the third flow characteristic. The first cage can be selectively coupled to the first seat ring or the second seat ring and the first seat ring can be selectively coupled to the first cage or the second cage.

17 Claims, 5 Drawing Sheets

(56) References Cited

U.S. PATENT DOCUMENTS

| | | | |
|---|---|---|---|
| 3,920,044 | A | 11/1975 | Gruner |
| 3,971,415 | A | 7/1976 | Foller |
| RE32,197 | E * | 7/1986 | Self .............................. 251/127 |
| 4,982,759 | A | 1/1991 | Scaramucci |
| 5,018,703 | A * | 5/1991 | Goode .......................... 251/127 |
| 5,238,219 | A | 8/1993 | Noelke et al. |
| 5,431,188 | A * | 7/1995 | Cove .......................... 137/625.3 |
| 5,706,854 | A * | 1/1998 | Haynes ......................... 137/526 |
| 5,765,814 | A * | 6/1998 | Dvorak et al. ................ 251/127 |
| 5,871,031 | A | 2/1999 | Greinacher |
| 5,909,747 | A * | 6/1999 | Schieber ....................... 137/492 |
| 5,964,248 | A | 10/1999 | Enarson et al. |
| 6,024,117 | A | 2/2000 | Tomita et al. |
| 6,279,605 | B1 | 8/2001 | Wang |
| 6,848,466 | B2 | 2/2005 | Durand |
| 6,877,714 | B2 | 4/2005 | Hall |
| 6,889,702 | B2 | 5/2005 | Hall et al. |
| 7,204,474 | B2 | 4/2007 | McGuire et al. |
| 2003/0089398 | A1* | 5/2003 | Hall et al. ..................... 137/327 |
| 2006/0207666 | A1* | 9/2006 | Micheel et al. ............ 137/625.3 |
| 2008/0029171 | A1* | 2/2008 | Weyer et al. ............. 137/625.33 |

FOREIGN PATENT DOCUMENTS

| | | |
|---|---|---|
| FR | 2192263 | 2/1974 |
| FR | 2285556 | 4/1976 |
| JP | 200050553 | 1/2000 |
| JP | 2002089722 | 3/2002 |
| WO | 9718411 | 5/1997 |

OTHER PUBLICATIONS

International Searching Authority, "Written Opinion of the International Searching Authority" issued in connection with counterpart International patent application PCT/US2008/059782, mailed on Aug. 6, 2008, 8 pages.

International Bureau, "International Preliminary Report on Patentability," issued in connection with international application serial No. PCT/US2008/059782, issued Oct. 20, 2009, 8 pages.

Russian Patent Office, "Office Action," issued in connection with Russian application serial No. 2009139198/06 (055540), issued Apr. 6, 2012, 6 pages.

European Patent Office, "Extended Search Report," issued in connection with European application serial No. 12168813.9, issued Jun. 19, 2012, 6 pages.

European Patent Office, "Extended Search Report," issued in connection with European application serial No. 12168817.0, issued Jun. 21, 2012, 6 pages.

European Patent Office, "Office Communication," issued in connection with European application serial No. 08 745 394.0, issued May 12, 2010, 3 pages.

State Intellectual Property Office of P.R. China, "Second Office Action," English translation, issued in connection with Chinese application serial No. 200880009364.9, issued Jan. 10, 2011, 14 pages.

Austrian Patent Office, "Examination Report," issued in connection with Austrian application serial No. GCC/P/2008/10621, mailed Sep. 9, 2011, 3 pages.

State Intellectual Property Office of P.R. China, "Fourth Office Action," English translation, issued in connection with Chinese application serial No. 200880009364.9, mailed Apr. 12, 2012, 6 pages.

State Intellectual Property Office of P.R. China, "Notification of the First Office Action," issued in connection with Chinese application No. 200880009364.9, issued Jun. 28, 2010, 13 pages.

State Intellectual Property Office of P.R. China, "Third Office Action," English translation, issued in connection with Chinese application serial No. 200880009364.9, issued Sep. 21, 2011, 17 pages.

Japanese Patent Office, "Office Action," issued in connection with Japanese application serial No. 2010-504165, issued Jul. 17, 2012, 4 pages.

State Intellectual Property Office of P.R. China, "Fifth Office Action," English translation, issued in connection with Chinese application serial No. 200880009364.9, mailed Oct. 29, 2012, 9 pages.

State Intellectual Property Office of P.R. China, "Decision of Rejection," English translation, issued in connection with Chinese application serial No. 200880009364.9, mailed Mar. 5, 2013, 8 pages.

* cited by examiner

TWO-PIECE TRIM FOR USE WITH FLUID REGULATORS

This application claims the benefit of U.S. Provisional Application Ser. No. 60/912,601, filed on Apr. 18, 2007, which is incorporated herein by reference in its entirety.

FIELD OF THE DISCLOSURE

The present disclosure relates generally to fluid regulators and, more particularly, to two-piece trim for use with fluid regulators.

BACKGROUND

Process control systems utilize a variety of field devices to control process parameters. Fluid valves and regulators are commonly distributed throughout process control systems to control the flow rates and/or pressures of various fluids (e.g., liquids, gasses, etc.). In particular, fluid regulators are typically used to regulate the pressure of a fluid to a substantially constant value. Specifically, a fluid regulator has an inlet that typically receives a supply fluid at a relatively high pressure and provides a relatively lower and substantially constant pressure at an outlet. For example, a gas regulator associated with a piece of equipment (e.g., a boiler) may receive a gas having a relatively high and somewhat variable pressure from a gas distribution source and may regulate the gas to have a lower, substantially constant pressure suitable for safe, efficient use by the equipment.

Fluid regulators typically control the flow and pressure of fluid using a diaphragm having a set or control pressure force applied to one of its sides via a bias spring. The diaphragm is also coupled directly or via a linkage (e.g., a lever) to a valve plug that is moved relative to an orifice of a seat ring that fluidly couples the inlet of the regulator to its outlet. The diaphragm moves the plug in response to a difference between the outlet pressure and the set or control pressure to vary the flow restriction provided by the plug to achieve a substantially constant outlet pressure, which provides a balancing force to the other side of the diaphragm that is equal or proportional to the set or control pressure.

In addition to a seat ring, many fluid regulators have trim including a cage that interposes in the flow path between the inlet and outlet of the fluid regulator to provide certain fluid flow characteristics. For example, some cages may be designed to provide torturous or other types of flow paths to reduce noise associated with flowing fluid. Such noise reduction cages, commonly referred to as sound trim, may be particularly useful in applications where the regulator is in close proximity to people (e.g., household occupants or other building occupants). Other regulator trim designs provide cages that provide certain fluid flow or regulation characteristics to suit the needs of a particular control application. For example, the cages may be configured to provide particular, desirable fluid flow versus pressure drop characteristics. Still further, regulator trim designs may also provide different types of seats or seat rings. For example, the size of the orifice may be varied to provide a more restricted seat (i.e., a seat that provides a relatively higher pressure drop at any given fluid flow rate) or a less restricted seat (i.e., a seat that provides a relatively lower pressure drop at any given flow rate).

However, known regulator trim utilizing a cage typically provides the cage and seat ring as a unitary or one-piece structure. Such a unitary or one-piece trim configuration eliminates the possibility of tolerance stack up that could occur if multiple components were used. In particular, the alignment of the cage and/or seat with the regulator body could be compromised by the cumulative tolerances of multiple, separate trim components. Further, such known unitary or one-piece trim enables the regulator to be used in certain vertical applications (e.g., where the bonnet is vertically oriented and pointing downward. In such vertical applications, if the regulator trim is to be serviced (e.g., replaced), installation of replacement trim would be very difficult, if not impossible, if the trim were not of a unitary or one-piece construction. In particular, the installation (e.g., stacking) of multiple trim components would likely result in a first installed component falling out of a desired mounting position and/or the regulator body (i.e., falling downward) while a second component is installed on top of the first component.

Yet another known regulator trim configuration provides only a seat ring (i.e., a seat ring without an integral cage), which is held in place within the regulator by pins. One such known configuration may be found in the EZH and EZL regulator products manufactured by Fisher Controls International LLC.

SUMMARY

In one described example, a fluid regulator has a regulator body, a seat ring disposed within the body and defining a fluid orifice, and a cage removably coupled to the seat ring.

In another described example, an apparatus for use with a fluid regulator has a cage for controlling a flow of fluid through the fluid regulator, and a seat ring to be mounted within the gas regulator and defining a fluid orifice. The seat ring includes a first shoulder to removably couple the seat ring to the cage and a second shoulder between the first shoulder and a sealing surface of the seat ring adjacent to the fluid orifice.

In another described example, an apparatus includes a plurality of different cages for use with a fluid regulator and a plurality of different seat rings for use with the fluid regulator. Each of the cages is to be removably coupled to each of the seat rings.

DETAILED DESCRIPTION

The example fluid regulator trim described herein provides a two-piece regulator trim configuration that enables interchangeability between multiple types of seat rings and cages. As a result of the interchangeability provided by the two-piece trim described herein, fewer total components are needed to provide a greater variety of trim configurations for fluid regulators. In other words, with the example fluid regulator trim described herein it is not necessary to manufacture and inventory each possible combination of seat configuration and cage configuration as is typically required with known unitary or one-piece trim designs. Instead, only the interchangeable seat ring and cage components need to be manufactured and stocked and the various different combinations of these components can be made as needed to suit particular applications.

The example two-piece fluid regulator trim described herein includes a cage and seat ring that can be removably coupled together. To facilitate the precise alignment of the cage and seat ring, the example seat rings described herein include a stepped profile having a first or outer shoulder that receives the cage. The example seat rings include a second or inner shoulder between the first shoulder and a sealing surface adjacent an orifice of the seat ring. The second shoulder is at a different height than the first shoulder, thereby forming a circumferential step or wall on the seat rings that facilitates the precise alignment of the cages and seat rings. In other words, the stepped configuration of the example seat rings described herein substantially minimizes or eliminates the manner in which the tolerances of these individual components could adversely affect (e.g., as a result of tolerance stack up) the operation of a fluid regulator.

Further, the example seat rings and cages described herein can be removably coupled in a manner that facilitates field service (e.g., replacement, repair, etc.) of the regulator trim, particularly in vertical applications (e.g., where the regulator bonnet or upper actuator casing is oriented downwardly). More specifically, the example seat rings and cages may be removably coupled (e.g., removably held together) using a grease (e.g., applied to the first shoulder), an interference fit, threads, etc. to prevent the cage and seat ring from separating and falling out of the regulator during replacement or repair operations.

Figure 1A:
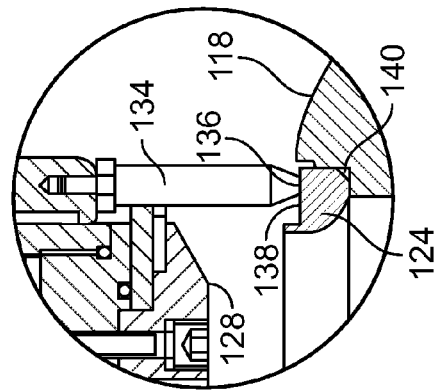
FIG. 1A is an enlarged cross-sectional view of a portion of the known fluid regulator of FIG. 1.
Figure 1:
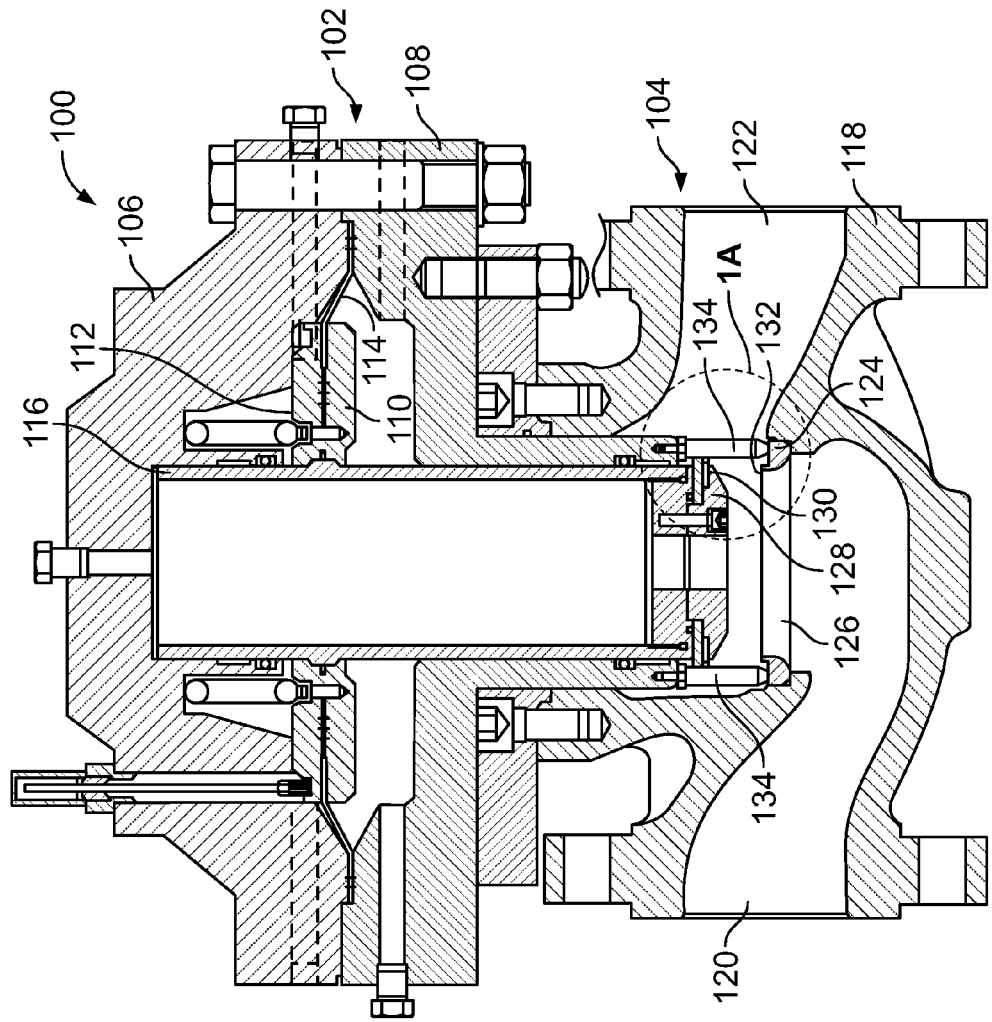
FIG. 1 is a cross-sectional view of a known fluid regulator.

Before discussing the example two-piece trim in detail, a brief description of a known fluid regulator 100 is provided below in connection with FIGS. 1 and 1A. As depicted in FIGS. 1 and 1A, the fluid regulator 100 includes an actuator 102 that is operatively coupled to a valve 104. The actuator 102 includes an upper actuator casing 106 and a lower actuator casing 108. The actuator casings 106 and 108 contain diaphragm plates 110 and 112, which hold a diaphragm 114 in operative engagement with a valve stem 116. The diaphragm 114 is also captured between the casings 106 and 108 as depicted in FIG. 1.

The lower actuator casing 108 is attached to a valve body 118 having an inlet 120 and an outlet 122. A seat ring 124 is mounted in the valve body 118 and defines an orifice 126 through which fluid may flow from the inlet 120 to the outlet 122. A valve plug 128 attached to an end of the stem 116 includes a sealing ring 130, which may be made of an elastomeric material, that is to sealingly engage a sealing surface 132 of the seat ring 124 when the stem 116 and the plug 128 are driven toward the orifice 126. As is known, movements of the valve plug 128 and, thus, the sealing ring 130 toward the orifice 126 (e.g., toward or into contact with the sealing surface 132) or away from the orifice 126 (e.g., away or out of contact with the sealing surface 132) are caused by pressure differences across the diaphragm 114, where the pressure differences are proportional to a difference between an actual pressure at the outlet 122 and a desired pressure at the outlet 122.

Spacers or pins 134 are coupled to the lower actuator casing 108 and, as can be seen most clearly in FIG. 1A, an end 136 of the pin 134 contacts a shoulder 138 of the seat ring 124 to hold the seat ring 124 in position within the valve body 118 in a manner that sufficiently displaces an o-ring 140 to effect a seal between the seat ring 124 and the valve body 118. Although not shown in FIGS. 1 and 1A, a plurality of such pins 134 may be spaced circumferentially about the seat ring 124 to hold the seat ring 124 in solid contact with the valve body 118 and to provide a substantially uniform sealing force to the o-ring 140.

Figure 2:
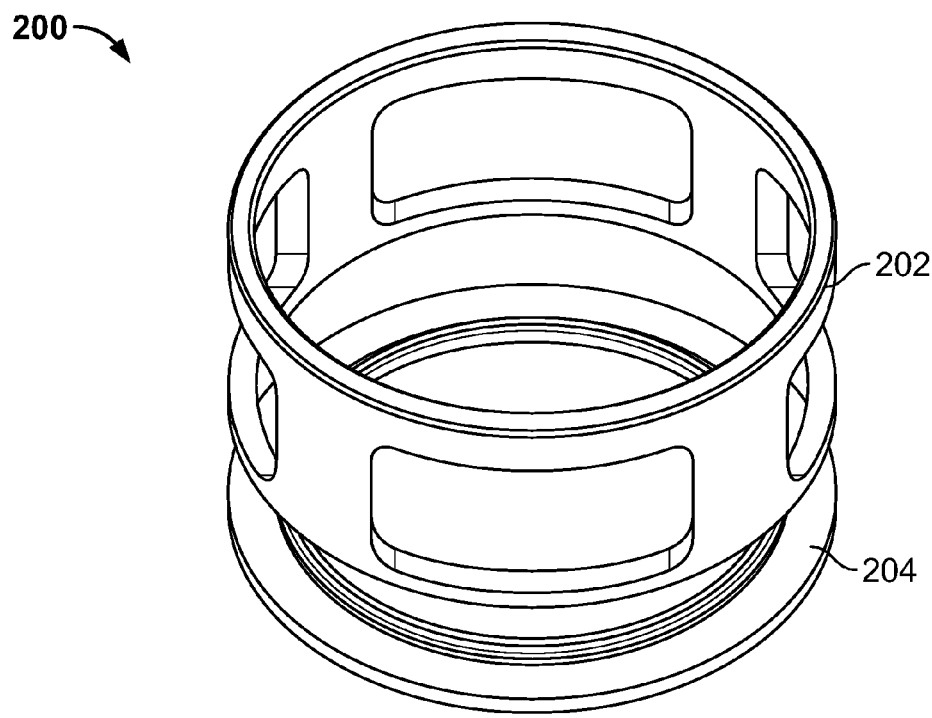
FIG. 2 depicts an example two-piece trim assembly for use in fluid regulators.

FIG. 2 depicts an example two-piece trim assembly 200 for use in fluid regulators. The two-piece trim assembly 200 includes a cage 202 and seat ring 204. As described in greater detail below, in contrast to known unitary fluid valve trim assemblies, the cage 202 may be removably coupled to the seat ring 204 to facilitate interchangeability of cages and seat rings and, thus, different combinations of cages and seat rings. For example, any of the example cages described herein, such as cages 202, 600 (FIG. 6), and 700 (FIG. 7), may be combined with any of the seat rings described herein, such as seat rings 204, 800 (FIG. 8), and 900 (FIG. 9), to achieve a desired flow and/or other performance characteristic for a fluid regulator. Additionally, because the example cages and seat rings described herein can be removably coupled, field servicing these components (e.g., to change a flow or other performance characteristic of a fluid regulator, to repair one or more of these components, etc.) is simplified, particularly in vertical applications in which multiple trim components are stacked and would tend to fall out of the fluid regulator during servicing operations.

Figure 3:
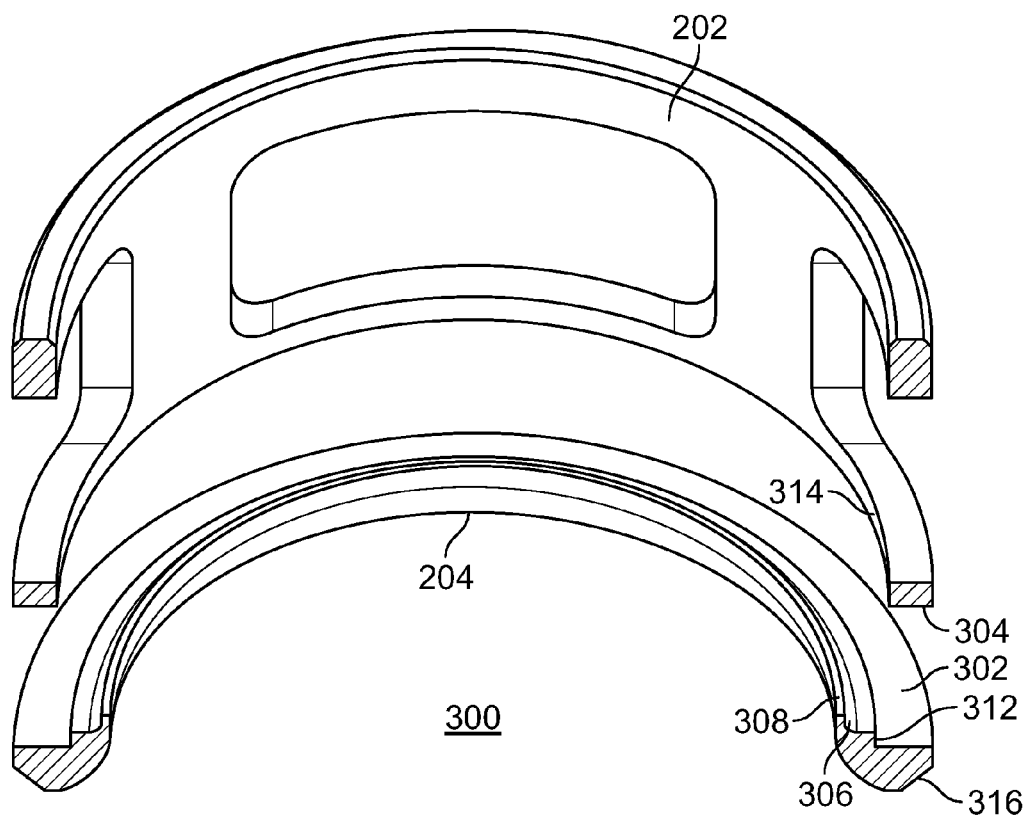
FIG. 3 is an enlarged cross-sectional view of the example two-piece trim assembly of FIG. 2.
Figure 4:
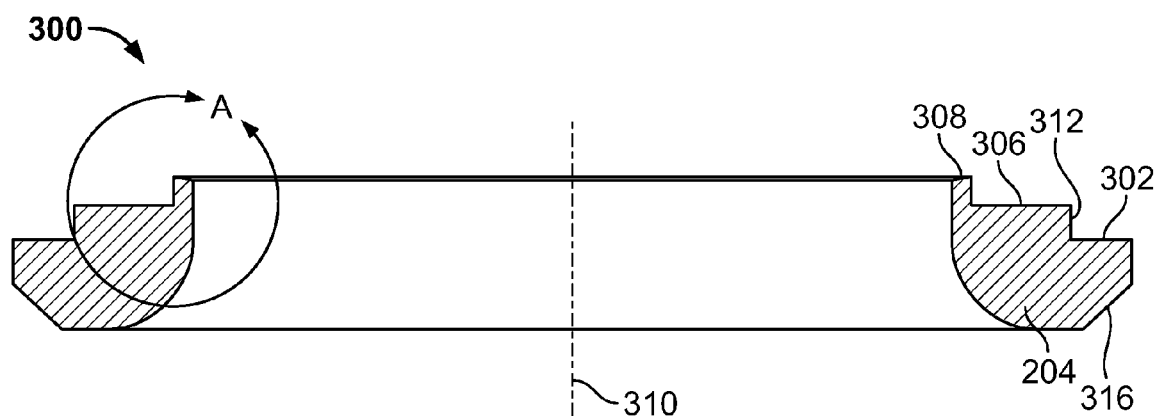
FIG. 4 is an enlarged cross-sectional view of the example seat ring shown in FIG. 3.

FIG. 3 is an enlarged cross-sectional view of the example two-piece trim assembly 200 shown in FIG. 2, and FIG. 4 is an enlarged cross-sectional view of the example seat ring 204 shown in FIGS. 2 and 3. The example seat ring 204 defines an orifice 300 through which fluid from a regulator inlet may pass to a regulator outlet. The seat ring 204 includes a first shoulder 302 to receive an end 304 of the cage 202 and to align the cage 202 with the orifice 300 and the regulator body (e.g., as shown in FIG. 5). The seat ring 204 includes a second shoulder 306 between the first shoulder 302 and a sealing surface 308 of the seat ring 204 adjacent to the fluid orifice 300. The first and second shoulders 302 and 306 are spaced along a longitudinal axis 310 of the seat ring 204. More specifically, in the example of FIGS. 3 and 4, the second shoulder 306 is spaced apart from the first shoulder 302 by a step or circumferential wall 312.

The step or wall 312 is configured to facilitate the alignment and removable coupling of the cage 202 to the seat ring 204. For example, an inner wall 314 of the cage 202 may be dimensioned or otherwise configured to be in close proximity to or to abut the step or wall 312. In particular, the step or wall 312 and the inner wall 314 may be dimensioned to or have shapes or geometries that result in an interference fit or press-fit between the inner wall 314 of the cage 202 and the step or wall 312. Such an interference or press-fit can be achieved by, for example, manufacturing the cage 202 so that at least a portion of the cage 202 is non-circular, out-of-round, etc. In this manner, if the step or wall 312 is substantially round and the non-circular or out-of-round portion of the cage 202 (e.g., the inner wall 314) is resiliently deformed into a substantially circular condition, the cage 202 can be coupled to (e.g., pressed onto) the seat ring 202 so that at least a portion of the inner wall 314 is firmly engaged against the step or wall 312 and the end 304 of the seat ring 202 is engaged with or otherwise coupled to the shoulder 302. Alternatively, both the cage 202 and seat ring 204 can be manufactured to have similar or identical non-circular (e.g., slightly elliptical) shapes so that the cage 202 can initially be loosely engaged with the seat ring 204 (e.g., the end 304 of the cage 202 can be placed on the shoulder 302 without having to forcibly press the cage 202 onto the seat ring 204) when the non-circular shapes of the cage 202 and seat ring 204 are aligned. The cage 202 and the seat ring 204 can then be rotated relative to each other, thereby causing at least a portion of the inner wall 314 to form an interference fit (e.g., bind) against the wall 312. In this case, the cage 202 and seat ring 204 can be separated by rotating the cage 202 and seat 204 to eliminate the interference or binding between the step or wall 312 and the inner wall 314 and pulling the cage 202 away from the seat ring 204. In yet another example, the step or wall 312 may be substantially circular or cylindrical and have a first diameter, and the inner wall 314 may also be substantially circular or cylindrical and have a second diameter smaller than the first diameter to enable a press-fit engagement between the cage 202 and the seat ring 204. Either or both of the inner wall 314 and the step or wall 312 may include a lead-in feature such as a chamfer, radius, etc. to facilitate the engagement of cage 202 to the seat ring 204 and the interference and/or press-fit engagement configurations of these components such as, for example, those described herein. The seat ring 204 also has a beveled surface 316 to sealingly engage an o-ring (e.g., the o-ring 504 of FIG. 5A) against a valve body (e.g., the valve body 118) to prevent fluid from leaking between the seat ring 204 and the valve body.

Still other types of engagement configurations may be employed in combination with the above-described interference and/or press-fit arrangements to removably couple the cage 202 to the seat ring 204. For example, an adhesive or a grease may be used to removably couple the cage 202 to the seat ring 204. In the case where grease or adhesive is used to couple the cage 202 to the seat ring 204, the cage 202 and the seat ring 204 may be sized to be relatively loosely coupled (e.g., without any interference or press-fit) and adhesive or grease may be applied to the shoulder 302, the wall 312, the end 304 of the cage 202, and/or the inner wall 314. As a result, when the end 304 of the cage 202 is seated on the shoulder 302, the adhesive or grease forms a layer between the mating surfaces of the cage 202 and the seat ring 204 that removably holds the cage 202 to the seat ring 204.

In yet another example, the inner wall 314 and the step or wall 312 may be threaded to enable the cage 202 to be threadingly engaged to the seat ring 302. Alternatively or additionally, the cage 202 and the seat ring 204 may be removably coupled using one or more set screws and/or roll pins.

Figure 5A:
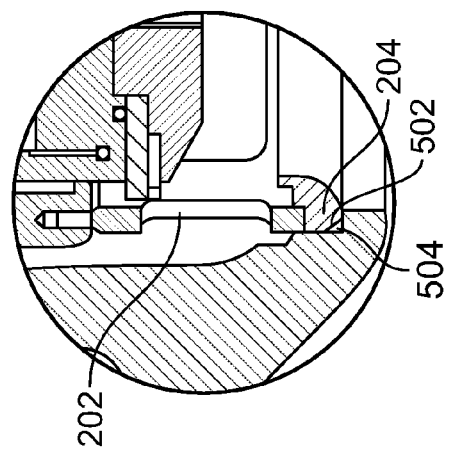
FIG. 5A is an enlarged cross-sectional view of a portion of the known fluid regulator of FIG. 5.
Figure 5:
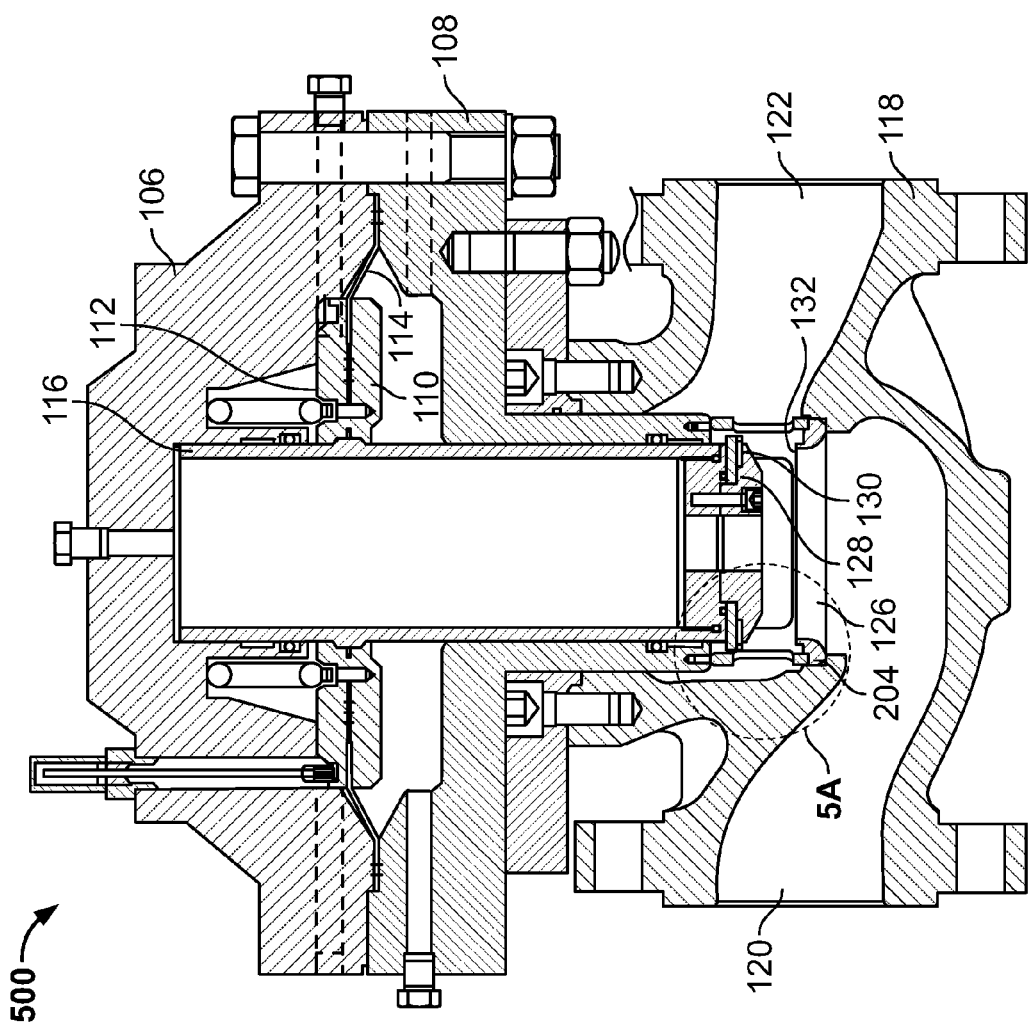
FIG. 5 is a cross-sectional view of a fluid regulator incorporating the example two-piece trim described herein.

FIG. 5 is a cross sectional view of an example fluid regulator 500 incorporating the example two-piece trim described herein, and FIG. 5A is an enlarged cross-sectional view of a portion of the known fluid regulator 500 shown in FIG. 5. Many of the components of the fluid regulator 500 of FIG. 5 are similar or identical to those of the known fluid regulator 100 of FIG. 1 and those components are identified in FIG. 5 using the same reference numbers used in FIG. 1. Further, the description of those components of FIG. 5 that are similar or identical to those of FIG. 1 is not repeated and the interested reader may refer to the description of FIG. 1 for those components. As can be seen in FIG. 5A, the seat ring 204 has a beveled surface 502 that sealingly engages an o-ring 504 against the valve body 118 to prevent fluid from leaking between the seat ring 204 and the valve body 118.

Figure 6:
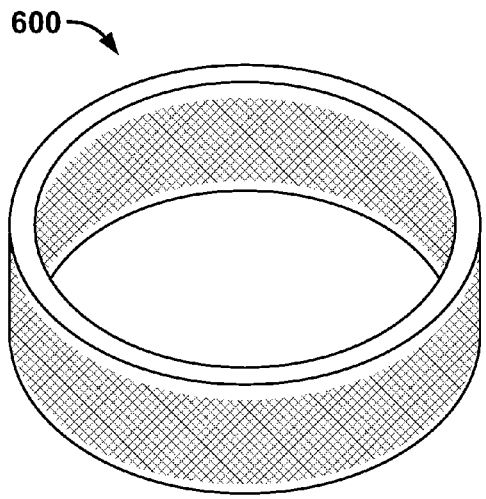
FIG. 6 depicts an example sound suppressing cage that may be used to implement the example two-piece trim described herein.
Figure 7:
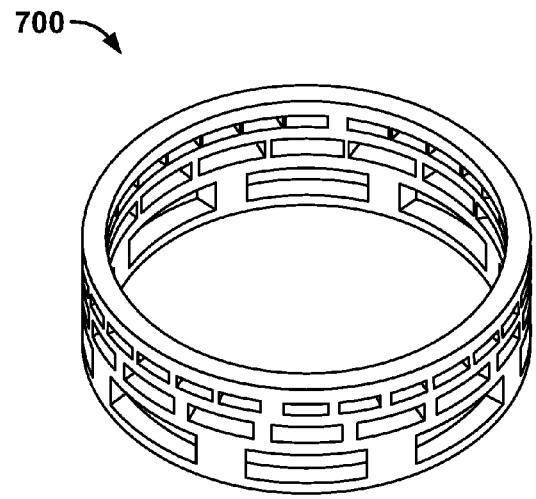
FIG. 7 depicts an example characterized cage that may be used to implement the example two-piece trim described herein.

FIG. 6 depicts an example sound suppressing cage 600 that may be used to implement the two-piece trim described herein. In particular, the example sound suppressing cage 600 may be used instead of the cage 202 to reduce the noise generated by fluid flowing through the example fluid valve 500 of FIG. 5. Similarly, FIG. 7 depicts an example characterized cage 700 that may be used instead of the cage 202 to achieve a different flow characteristic (e.g., a different pressure drop versus flow characteristic) than that provided by the cage 202 (FIG. 2).

Figure 8:
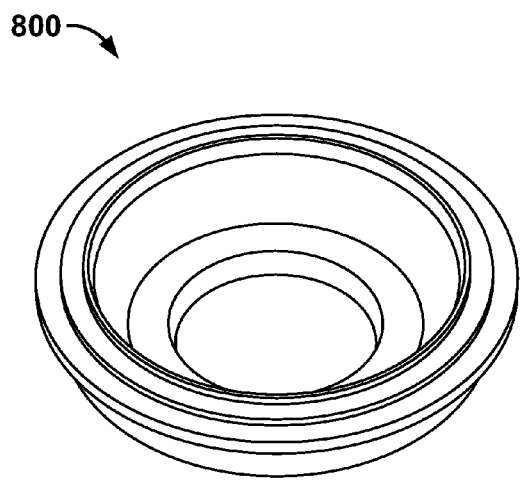
FIG. 8 depicts an example restricted seat that may be used to implement the example two-piece trim described herein.
Figure 9:
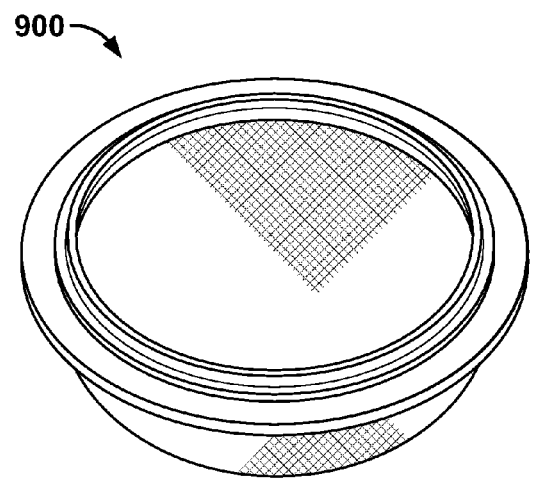
FIG. 9 depicts an example strainer seat that may be use to implement the example two-piece trim described herein.

FIG. 8 depicts an example restricted seat 800 that may be used to implement the two-piece trim described herein. In particular, the example restricted seat 800 may be used instead of the seat ring 204 (FIG. 2) to provide a fluid orifice having a higher restriction (i.e., a greater pressure drop at any given fluid flow rate). Similarly, FIG. 9 depicts an example strainer seat 900 that may be used instead of the seat ring 204 (FIG. 2). Regardless of which of the seats 204, 800, and 900 is used to implement the two-piece trim described herein, each of the seat rings 204, 800, and 900 provides first and second shoulders and a step or wall to facilitate alignment and removable coupling between any one of the seat rings 204, 800, and 900 to of any one of the cages 202, 600, and 700.

Although certain example apparatus have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. A fluid regulator, comprising:
   a regulator body;
   a first seat ring defining an orifice, the first seat ring to be disposed within the regular body, the first seat ring to provide a first fluid flow characteristic, the first seat ring being interchangeable with a second seat ring, the second seat ring to provide a second fluid flow characteristic, the first seat ring having first, second, and third annular surfaces spaced along a longitudinal axis of the regulator body that extends through the orifice, the second annular surface being between the first and third annular surfaces, a first circumferential wall being between the first and second annular surfaces, a second circumferential wall being between the second and third annular surfaces, the third annular surface to be sealingly engaged by a valve plug; and
   a first cage to provide a third fluid flow characteristic, the first cage being interchangeable with a second cage, the second cage to provide a fourth fluid characteristic, the first cage having an end and an inner wall, the end to engage the first annular surface and the inner wall is engage the first circumferential wall, the second annular surface defining a gap between the first and third annular surfaces to enable interchangeability of the first cage with the second cage.

2. A fluid regulator as defined in claim 1, wherein the first seat ring is coupled to the first cage via at least one of an interference fit, threads, adhesive, a set screw, a roll pin, or grease.

3. A fluid regulator as defined in claim 1, wherein the first fluid flow characteristic of the first seat ring provides a greater fluid pressure drop through the orifice of the fluid regulator at a given fluid flow rate than the second fluid flow characteristic provided by the second seat ring.

4. A fluid regulator as defined in claim 1, wherein the first cage provides a pressure drop versus flow characteristic that is different than a pressure drop versus flow characteristic provided by the second cage.

5. An apparatus as defined in claim 1, wherein the first seat ring comprises a strainer seat ring and the second seat ring comprises a restricted seat ring.

6. A fluid regulator as defined in claim 1, wherein the first circumferential wall of the first seat ring has a first diameter and the inner wall of the first cage has a second diameter that is smaller than the first diameter to enable press-fit engagement between the first cage and the first seat ring.

7. A fluid regulator as defined in claim 1, wherein each of the first and second seat rings further comprises a respective beveled surface to engage an o-ring.

8. An apparatus for use with a fluid regulator, comprising:
a first cage for controlling a flow of fluid through the fluid regulator, the first cage to provide a first flow characteristic, the first cage being interchangeable with a second cage, the second cage to provide a second flow characteristic, the first cage having a first inner wall and a first end, a first distance between facing portions of the first inner wall having a first dimension; and
a first seat ring to be mounted within the fluid regulator and defining a fluid orifice, wherein the first seat ring includes a first outer wall, a second distance between opposing portions of the first outer wall having a second dimension that is larger than the first dimension of the first cage; and
a second seat ring replaceable with and different from the first seat ring, wherein the second seat ring is to be removably coupled to the first cage and includes a second outer wall that is substantially similar to the first outer wall, and wherein the second seat ring provides a third fluid flow characteristic that is different than a fourth fluid flow characteristic provided by the first seat ring,
wherein each of the first and second seat rings comprises first, second, and third annular surfaces spaced along a longitudinal axis of the regulator body that extends through the fluid orifice, the second annular surface being between the first and third annular surfaces, a first circumferential wall being between the first and second annular surfaces, a second circumferential wall being between the second and third annular surfaces, the third annular surface to be sealingly engaged by a valve plug, the first end to engage the first annular surface, the second annular surface defining a gap between the first and third annular surfaces to enable interchangeability of the first cage and the second cage.

9. An apparatus as defined in claim 8, further comprising a third cage different than the first and second cages, wherein the third cage is to be removably coupled to the first seat ring or second seat ring.

10. An apparatus as defined in claim 8, wherein the cages comprise at least a sound trim or a characterized trim.

11. An apparatus as defined in claim 8, wherein at least two surfaces of the cage engage at least two surfaces of the first seat ring when the cage is coupled to the first seat ring.

12. An apparatus for use with a fluid regulator comprising:
a plurality of different and interchangeable cages for use with the fluid regulator, wherein each of the cages has a cage interface that includes a rectangular cross-sectional shape; and
a plurality of different and interchangeable seat rings for use with the fluid regulator, each of the seat rings having first, second, and third annular surfaces to be spaced along a longitudinal axis of the regulator body that extends through the fluid orifice, the second annular surface being between the first and third annular surfaces, a first circumferential wall being between the first and second annular surfaces, a second circumferential wall being between the second and third annular surfaces, the third annular surface to be sealingly engaged by a valve plug,
wherein each of the cages is to be removably coupled to each of the seat rings such that the first circumferential wall engages or surrounds a surface of the cage interface to couple the seat rings to the cages and to align the cages with the seat rings, wherein each of the seat rings provides a different fluid flow characteristic to a fluid flowing through the fluid regulator, the second annular surface of the seat rings to define a gap between the first and third annular surfaces to enable interchangeability of the cages.

13. An apparatus as defined in claim 12, wherein each of the seat rings is to align the cages with the fluid regulator.

14. An apparatus as defined in claim 12, wherein each of the seat rings is to be removably coupled to each of the cages via at least one of an interference fit, threads, adhesive, a set screw, a roll pin, or grease.

15. A method of coupling a two-piece trim apparatus for use with a fluid valve, the method comprising:
selecting a first seat ring from a plurality of seat rings, each of the seat rings having first, second, and third annular surfaces spaced along a longitudinal axis of the regulator body that extends through the fluid orifice, the second annular surface being between the first and third annular surfaces, a first circumferential wall being between the first and second annular surfaces, a second circumferential wall being between the second and third annular surfaces, the third annular surface to be sealingly engaged by a valve plug;
selecting a first cage from a plurality of cages, each of the cages having a cage interface that is to engage the seat ring interface, wherein the cage interface includes an edge to define an inner surface or wall; and
coupling the first cage and the first seat ring such that the edge of the first cage engages the first annular surface,
wherein the second annular surface defines a gap between the first and third annular surfaces to enable interchangeability of the first cage with a second cage of the plurality of cages.

16. A method of claim 15, further comprising replacing the first seat ring with a second seat ring from the seat rings and coupling the second seat ring to the first cage, wherein the first seat ring is to provide a first predetermined flow characteristic that is different from a second predetermined flow characteristic provided by the second seat ring.

17. A method of claim 16, further comprising replacing the first cage with the second cage and coupling the second cage with the first seat ring or the second seat ring, wherein the first cage is to provide a first predetermined fluid flow characteristic that is different from a second predetermined flow characteristic provided by a second cage.

* * * * *